United States Patent
Dong et al.

(10) Patent No.: US 9,900,676 B2
(45) Date of Patent: Feb. 20, 2018

(54) WEARABLE COMPUTING DEVICE WITH INDIRECT BONE-CONDUCTION SPEAKER

(71) Applicant: Google LLC, Mountain View, CA (US)

(72) Inventors: Jianchun Dong, Palo Alto, CA (US); Liang-Yu Tom Chi, San Francisco, CA (US); Mitchell Heinrich, San Francisco, CA (US); Leng Ooi, San Jose, CA (US)

(73) Assignee: Google LLC, Mountain View, CA (US)

( * ) Notice: Subject to any disclaimer, the term of this patent is extended or adjusted under 35 U.S.C. 154(b) by 80 days.

(21) Appl. No.: 15/066,253

(22) Filed: Mar. 10, 2016

(65) Prior Publication Data
US 2016/0192048 A1 Jun. 30, 2016

Related U.S. Application Data

(63) Continuation of application No. 13/269,935, filed on Oct. 10, 2011, now abandoned.
(Continued)

(51) Int. Cl.
*H04R 1/02* (2006.01)
*H04R 5/02* (2006.01)
(Continued)

(52) U.S. Cl.
CPC ......... *H04R 1/028* (2013.01); *G02B 27/0176* (2013.01); *H04R 1/1066* (2013.01); *H04R 5/023* (2013.01); *H04R 2460/13* (2013.01)

(58) Field of Classification Search
CPC ...... H04R 1/028; H04R 1/1066; H04R 5/023; H04R 2460/13; G02B 27/0176
(Continued)

(56) References Cited

U.S. PATENT DOCUMENTS 5,282,253 A 1/1994 Konomi
5,457,751 A 10/1995 Such
(Continued)

FOREIGN PATENT DOCUMENTS

WO 2008123667 A1 10/2008

OTHER PUBLICATIONS

DeVaul, Richard W., The Memory Glasses: Wearable Computing for Just-In-Time Memory Support, School of Architecture and Planning, Massachusetts Institute of Technology, Jun. 2004, pp. 1-100, available online at: http://pubs.media.mit.edu/pubs/papers/DeVaul.pdf (last visited Oct. 6, 2011).
(Continued)

*Primary Examiner* — Sean H Nguyen
(74) *Attorney, Agent, or Firm* — McDonnell Boehnen Hulbert & Berghoff LLP (57) ABSTRACT

Exemplary wearable computing systems may include a head-mounted display that is configured to provide indirect bone-conduction audio. For example, an exemplary head-mounted display may include at least one vibration transducer that is configured to vibrate at least a portion of the head-mounted display based on the audio signal. The vibration transducer is configured such that when the head-mounted display is worn, the vibration transducer vibrates the head-mounted display without directly vibrating a wearer. However, the head-mounted display structure vibrationally couples to a bone structure of the wearer, such that vibrations from the vibration transducer may be indirectly transferred to the wearer's bone structure.

20 Claims, 5 Drawing Sheets

Related U.S. Application Data (60) Provisional application No. 61/509,997, filed on Jul. 20, 2011.

(51) Int. Cl.
*G02B 27/01* (2006.01)
*H04R 1/10* (2006.01)

(58) Field of Classification Search
USPC .......................................................... 381/151
See application file for complete search history.

(56) References Cited

U.S. PATENT DOCUMENTS

| | | |
|---|---|---|
| 5,986,813 A | 11/1999 | Saikawa et al. |
| 6,091,546 A | 7/2000 | Spitzer |
| 6,215,655 B1 | 4/2001 | Heady et al. |
| 6,301,367 B1 | 10/2001 | Boyden |
| 6,349,001 B1 | 2/2002 | Spitzer |
| 6,463,157 B1 | 10/2002 | May |
| 7,004,582 B2 | 2/2006 | Jannard et al. |
| 7,147,324 B2 | 12/2006 | Jannard et al. |
| 7,233,684 B2 | 6/2007 | Fedorovskaya et al. |
| 7,264,350 B2 | 9/2007 | Jannard et al. |
| 7,310,427 B2 | 12/2007 | Retchin et al. |
| 7,445,332 B2 | 11/2008 | Jannard et al. |
| 7,543,934 B2 | 6/2009 | Howell et al. |
| 7,555,136 B2 | 6/2009 | Wang |
| 7,580,540 B2 | 8/2009 | Zurek et al. |
| 7,792,552 B2 | 9/2010 | Thomas |
| 8,223,088 B1 | 7/2012 | Gomez et al. |
| 2002/0039427 A1 | 4/2002 | Whitwell et al. |
| 2002/0124295 A1 | 9/2002 | Fenwick et al. |
| 2005/0275714 A1* | 12/2005 | Ishikawa ............... A61B 5/1171 348/14.02 |
| 2006/0034478 A1 | 2/2006 | Davenport |
| 2006/0132382 A1 | 6/2006 | Jannard |
| 2006/0203183 A1 | 9/2006 | Jannard et al. |
| 2007/0069976 A1 | 3/2007 | Willins et al. |
| 2008/0311966 A1 | 12/2008 | Klein |
| 2009/0259090 A1 | 10/2009 | Parker |
| 2009/0304210 A1 | 12/2009 | Weisman |
| 2010/0110368 A1* | 5/2010 | Chaum ................ G02B 27/017 351/158 |
| 2010/0149073 A1* | 6/2010 | Chaum ............... G02B 27/0093 345/8 |
| 2010/0238396 A1 | 9/2010 | Jannard |
| 2010/0253904 A1 | 10/2010 | Jannard |
| 2010/0272304 A1 | 10/2010 | Thiel |
| 2011/0043617 A1 | 2/2011 | Vertegaal |
| 2011/0158444 A1 | 6/2011 | Waldmann |
| 2011/0224481 A1* | 9/2011 | Lee ........................ G02C 11/06 600/25 |
| 2011/0301729 A1 | 12/2011 | Heiman et al. |
| 2012/0106777 A1 | 5/2012 | Fujimoto et al. |
| 2012/0289162 A1* | 11/2012 | Hosoi .................. H04R 25/606 455/41.3 |
| 2013/0127980 A1* | 5/2013 | Haddick ................ G06F 3/013 348/14.08 |

OTHER PUBLICATIONS

DeVaul, Richard W., The Memory Glasses: Wearable Computing for Just-In-Time Memory Support, School of Architecture and Planning, Massachusetts Institute of Technology, Jun. 2004, pp. 101-181, available online at: http://pubs.media.mit.edu/pubs/papers/DeVaul.pdf (last visited Oct. 6, 2011).

Belinky, Mariano et al., Sound Through Bone Conduction in Public Interfaces, New York University, 2001, available online at: http://portal.acm.org/citation.cfm?id=634177 (last visited Oct. 6, 2011).

Boujarwah, Fatima et al., A Study of Wearable Computing available online at: http://www.cis.upenn.edu/-palsetia/cit595s07/projects07/Wearablecomputing.pdf (last visited Jun. 24, 2011).

Linn, Silvan et al., Smart-Rollator Conductor Assisted Obstacle Avoidance System, Carleton University School of Industrial Design, Winter 2008.

Borg, Erik, et al., A Three-Microphone System for Real-Time Directional Analysis: Toward a Device for 6 Environmental Monitoring in Deaf-Blind, Journal of Rehabilitation Research and Development, Mar./Apr. 2001, pp. 265-272, vol. 38, No. 2, Department of Veterans Affairs.

* cited by examiner

WEARABLE COMPUTING DEVICE WITH INDIRECT BONE-CONDUCTION SPEAKER

CROSS-REFERENCE TO RELATED APPLICATION

This application is a continuation of U.S. patent application Ser. No. 13/269,935, filed on Oct. 10, 2011, which claims priority to U.S. Provisional Patent Application No. 61/509,997, filed Jul. 20, 2011, both of which are incorporated herein by reference in their entirety and for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

SUMMARY

In one aspect, an exemplary wearable-computing system may include: (a) one or more optical elements; (b) a support structure comprising a front section and at least one side section, wherein the support structure is configured to support the one or more optical elements; (c) an audio interface configured to receive an audio signal; and (d) at least one vibration transducer located on the at least one side section, wherein the at least one vibration transducer is configured to vibrate at least a portion of the support structure based on the audio signal. In this exemplary wearable-computing system, the vibration transducer is configured such that when the support structure is worn, the vibration transducer vibrates the support structure without directly vibrating a wearer. Further, the support structure is configured such that when worn, the support structure vibrationally couples to a bone structure of the wearer.

In another aspect, an exemplary wearable-computing system may include: (a) a support structure comprising a front section and at least one side section, wherein the support structure is configured to support the one or more optical elements; (b) a means for receiving an audio signal; and (c) a means for vibrating at least a portion of the support structure based on the audio signal, wherein the means for vibrating is located on the at least one side section. In this exemplary wearable-computing system, the means for vibrating is configured such that when the support structure is worn, the means for vibrating vibrates the support structure without directly vibrating a wearer. Further, the support structure is configured such that when worn, the support structure vibrationally couples to a bone structure of the wearer.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

The disclosure generally involves a wearable computing system with a head-mounted display (HMD), and in particular, an HMD having at least one vibration transducer that functions as a speaker. An exemplary HMD may employ vibration transducers that are commonly referred to as bone-conduction transducers. However, standard applications of bone-conduction transducers involve direct transfer of sound to the inner ear by attaching the transducer directly to the bone (or a pad that is adjacent to the bone). An exemplary HMD, on the other hand, may include a bone-conduction transducer (or another type of vibration transducer) that transfers sound to the wearer's ear via "indirect bone conduction."

More specifically, an exemplary HMD may include a vibration transducer that does not vibrationally couple to wearer's bone structure (e.g., a vibration transducer that is located so as to avoid substantial contact with the wearer when the HMD is worn). Instead, the vibration transducer is configured to vibrate the frame of the HMD. The HMD frame is in turn vibrationally coupled to the wearer's bone structure. As such, the HMD frame transfers vibration to the wearer's bone structure such that sound is perceived in the wearer's inner ear. In this arrangement, the vibration transducer does not directly vibrate the wearer, and thus may be said to function as an "indirect" bone conduction speaker.

In an exemplary embodiment, the vibration transducer may be placed at a location on the HMD that does not contact the wearer. For example, on a glasses-style HMD, a vibration transducer may be located on a side-arm of the HMD, near where the side-arm connects to the front of the HMD. Further, in an exemplary embodiment, the HMD may be configured such that when worn, there is space (e.g., air) between the portion of the HMD where the vibration transducer is located and the wearer. As such, the portion of the HMD that contacts and vibrationally couples to the wearer may be located away from the vibration transducer.

In another aspect, because the vibration transducer vibrates the frame of the HMD instead of directly vibrating a wearer, the frame may transmit the audio signal through the air as well. In some embodiments, the airborne audio signal may be heard by the wearer, and may actually enhance the sound perceived via indirect bone conduction. At the same time, this airborne audio signal may be much quieter than airborne audio signals emanating by traditional diaphragm speakers, and thus may provide more privacy to the wearer.

In a further aspect, one or more couplers may be attached to the HMD frame to enhance the fit of the HMD to the wearer and help transfer of vibrations from the frame to the wearer's bone structure. For example, a fitting piece, which may be moldable and/or made of rubber or silicone gel, for example, may be attached to the HMD frame. The fitting piece may be attached to the HMD frame in various ways. For instance, a fitting piece may be located behind the wearer's temple and directly above their ear, or in the pit behind the wearer's ear lobe, among other locations.

II. Exemplary Wearable Computing Devices

Systems and devices in which exemplary embodiments may be implemented will now be described in greater detail. In general, an exemplary system may be implemented in or may take the form of a wearable computer (i.e., a wearable-computing device). In an exemplary embodiment, a wearable computer takes the form of or includes an HMD. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

In a further aspect, an HMD may generally be any display device that is worn on the head and places a display in front of one or both eyes of the wearer. An HMD may take various forms such as a helmet or eyeglasses. As such, references to "eyeglasses" herein should be understood to refer to an HMD that generally takes the form of eyeglasses. Further, features and functions described in reference to "eyeglasses" herein may apply equally to any other kind of HMD.

Figure 1:
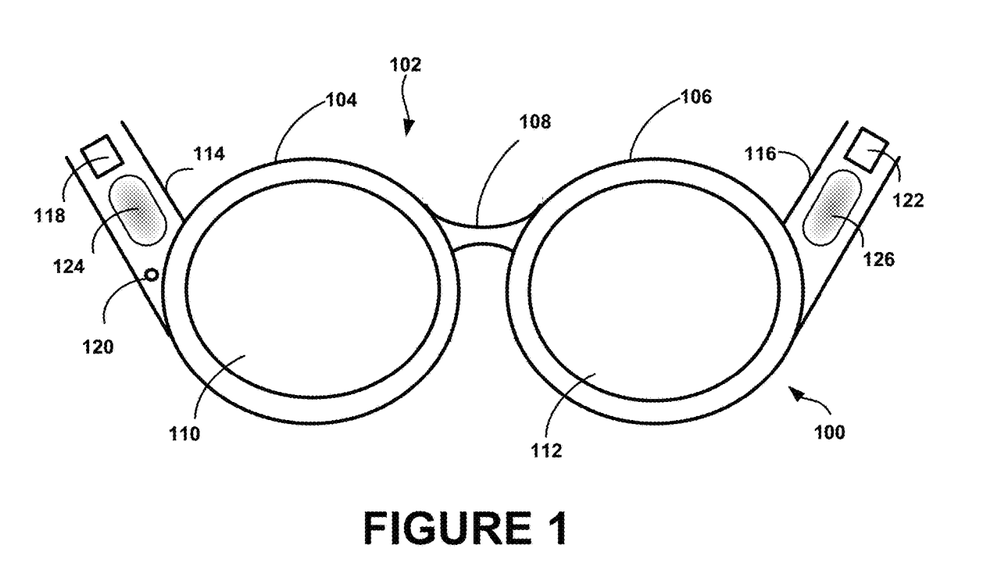
FIG. 1 illustrates a wearable computing system according to an exemplary embodiment.

FIG. 1 illustrates a wearable computing system according to an exemplary embodiment. The wearable computing system is shown in the form of eyeglass 102. However, other types of wearable computing devices could additionally or alternatively be used. The eyeglasses 102 include a support structure that is configured to support the one or more optical elements.

In general, the support structure of an exemplary HMD may include a front section and at least one side section. In FIG. 1, the support structure has a front section that includes lens-frames 104 and 106 and a center frame support 108. Further, in the illustrated embodiment, side-arms 114 and 116 serve as a first and a second side section of the support structure for eyeglasses 102. It should be understood that the front section and the at least one side section may vary in form, depending upon the implementation.

Herein, the support structure of an exemplary HMD may also be referred to as the "frame" of the HMD. For example, the support structure of eyeglasses 102, which includes lens-frames 104 and 106, center frame support 108, and side-arms 114 and 116, may also be referred to as the "frame" of eyeglasses 102.

The frame of the eyeglasses 102 may function to secure eyeglasses 102 to a user's face via a user's nose and ears. More specifically, the side-arms 114 and 116 are each projections that extend away from the frame elements 104 and 106, respectively, and are positioned behind a user's ears to secure the eyeglasses 102 to the user. The side-arms 114 and 116 may further secure the eyeglasses 102 to the user by extending around a rear portion of the user's head. Additionally or alternatively, for example, the system 100 may connect to or be affixed within a head-mounted helmet structure. Other possibilities exist as well.

In an exemplary embodiment, each of the frame elements 104, 106, and 108 and the side-arms 114 and 116 may be formed of a solid structure of plastic or metal, or may be formed of a hollow structure of similar material so as to allow wiring and component interconnects to be internally routed through the eyeglasses 102. Other materials or combinations of materials are also possible. Further, the size, shape, and structure of eyeglasses 102, and the components thereof, may vary depending upon the implementation.

Further, each of the optical elements 110 and 112 may be formed of any material that can suitably display a projected image or graphic. Each of the optical elements 110 and 112 may also be sufficiently transparent to allow a user to see through the optical element. Combining these features of the optical elements can facilitate an augmented reality or heads-up display where the projected image or graphic is superimposed over a real-world view as perceived by the user through the optical elements.

The system 100 may also include an on-board computing system 118, a video camera 120, a sensor 122, and finger-operable touchpads 124, 126. The on-board computing system 118 is shown to be positioned on the side-arm 114 of the eyeglasses 102; however, the on-board computing system 118 may be provided on other parts of the eyeglasses 102. The on-board computing system 118 may include a processor and memory, for example. The on-board computing system 118 may be configured to receive and analyze data from the video camera 120 and the finger-operable touchpads 124, 126 (and possibly from other sensory devices, user interfaces, or both) and generate images for output from the optical elements 110 and 112.

The video camera 120 is shown to be positioned on the side-arm 114 of the eyeglasses 102; however, the video camera 120 may be provided on other parts of the eyeglasses 102. The video camera 120 may be configured to capture images at various resolutions or at different frame rates. Many video cameras with a small form-factor, such as those used in cell phones or webcams, for example, may be incorporated into an example of the system 100. Although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown mounted on the side-arm 116 of the eyeglasses 102; however, the sensor 122 may be provided on other parts of the eyeglasses 102. The sensor 122 may include one or more of a gyroscope or an accelerometer, for example. Other sensing devices may be included within the sensor 122 or other sensing functions may be performed by the sensor 122.

In an exemplary embodiment, sensors such as sensor 122 may be configured to detect head movement by a wearer of eyeglasses 102. For instance, a gyroscope and/or accelerometer may be arranged to detect head movements, and may be configured to output head-movement data. This head-movement data may then be used to carry out functions of an exemplary method, such as method 100, for instance.

The finger-operable touchpads 124, 126 are shown mounted on the side-arms 114, 116 of the eyeglasses 102. Each of finger-operable touchpads 124, 126 may be used by a user to input commands. The finger-operable touchpads 124, 126 may sense at least one of a position and a movement of a finger via capacitive sensing, resistance sensing, or a surface acoustic wave process, among other possibilities. The finger-operable touchpads 124, 126 may be capable of sensing finger movement in a direction parallel or planar to the pad surface, in a direction normal to the pad surface, or both, and may also be capable of sensing a level of pressure applied. The finger-operable touchpads 124, 126 may be formed of one or more transparent or transparent insulating layers and one or more transparent or transparent conducting layers. Edges of the finger-operable touchpads 124, 126 may be formed to have a raised, indented, or roughened surface, so as to provide tactile feedback to a user when the user's finger reaches the edge of the finger-operable touchpads 124, 126. Each of the finger-operable touchpads 124, 126 may be operated independently, and may provide a different function.

Figure 2:
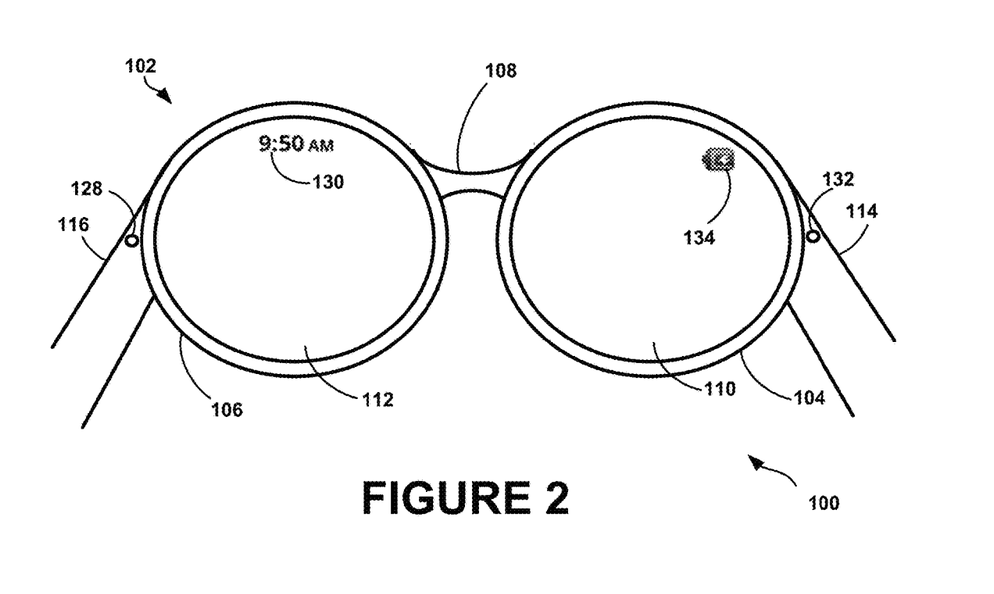
FIG. 2 illustrates an alternate view of the wearable computing system of FIG. 1.

FIG. 2 illustrates an alternate view of the wearable computing system of FIG. 1. As shown in FIG. 2, the optical elements 110 and 112 may act as display elements. The eyeglasses 102 may include a first projector 128 coupled to an inside surface of the side-arm 116 and configured to project a display 130 onto an inside surface of the optical element 112. Additionally or alternatively, a second projector 132 may be coupled to an inside surface of the side-arm 114 and configured to project a display 134 onto an inside surface of the optical element 110.

The optical elements 110 and 112 may act as a combiner in a light projection system and may include a coating that reflects the light projected onto them from the projectors 128 and 132. In some embodiments, a special coating may not be used (e.g., when the projectors 128 and 132 are scanning laser devices).

In alternative embodiments, other types of display elements may also be used. For example, the optical elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104 and 106 for driving such a matrix display. Alternatively or additionally, a laser or LED source and scanning system could be used to draw a raster display directly onto the retina of one or more of the user's eyes. Other possibilities exist as well.

While FIGS. 1 and 2 show two touchpads and two display elements, it should be understood that many exemplary methods and systems may be implemented in wearable computing devices with only one touchpad and/or with only one optical element having a display element. It is also possible that exemplary methods and systems may be implemented in wearable computing devices with more than two touchpads.

Figure 3:
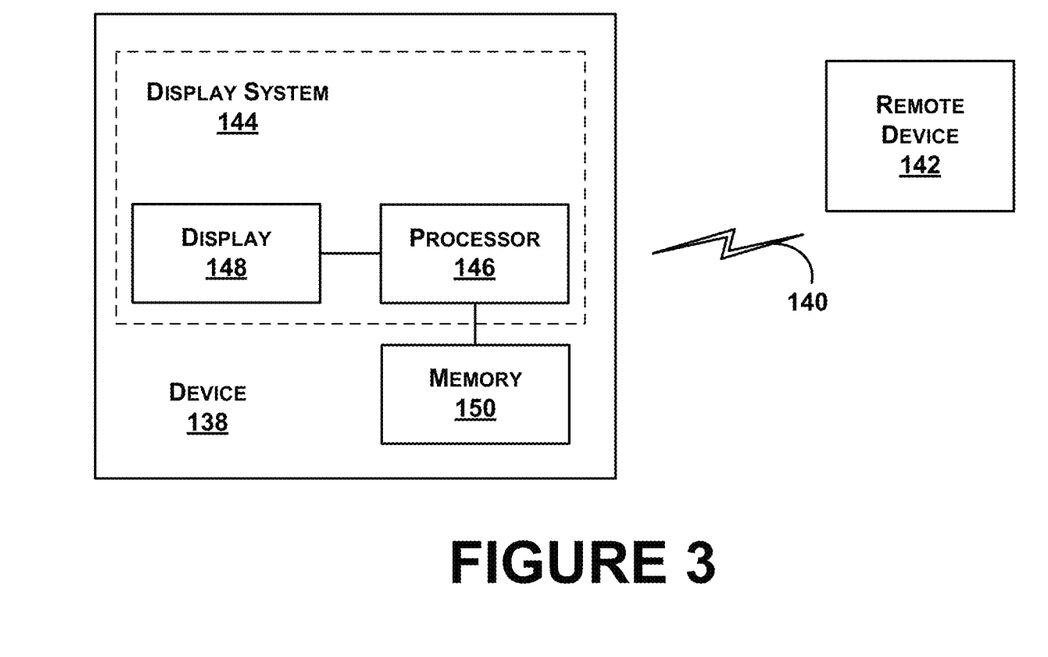
FIG. 3 illustrates an exemplary schematic drawing of a wearable computing system.

FIG. 3 illustrates an exemplary schematic drawing of a wearable computing system. In particular, a computing device 138 communicates using a communication link 140 (e.g., a wired or wireless connection) to a remote device 142. The computing device 138 may be any type of device that can receive data and display information corresponding to or associated with the data. For example, the computing device 138 may be a heads-up display system, such as the eyeglasses 102 described with reference to FIGS. 1 and 5.

Thus, the computing device 138 may include a display system 144 comprising a processor 146 and a display 148. The display 148 may be, for example, an optical see-through display, an optical see-around display, or a video see-through display. The processor 146 may receive data from the remote device 142, and configure the data for display on the display 148. The processor 146 may be any type of processor, such as a micro-processor or a digital signal processor, for example.

The computing device 138 may further include on-board data storage, such as memory 150 coupled to the processor 146. The memory 150 may store software that can be accessed and executed by the processor 146, for example.

The remote device 142 may be any type of computing device or transmitter including a laptop computer, a mobile telephone, etc., that is configured to transmit data to the device 138. The remote device 142 and the device 138 may contain hardware to enable the communication link 140, such as processors, transmitters, receivers, antennas, etc.

In FIG. 3, the communication link 140 is illustrated as a wireless connection; however, wired connections may also be used. For example, the communication link 140 may be a wired link via a serial bus such as a universal serial bus or a parallel bus. A wired connection may be a proprietary connection as well. The communication link 140 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 142 may be accessible via the Internet and may comprise a computing cluster associated with a particular web service (e.g., social-networking, photo sharing, address book, etc.).

II. Exemplary HMDs Configured for Indirect Bone Conduction

A. Exemplary HMD with Vibration Transducer

Figure 4:
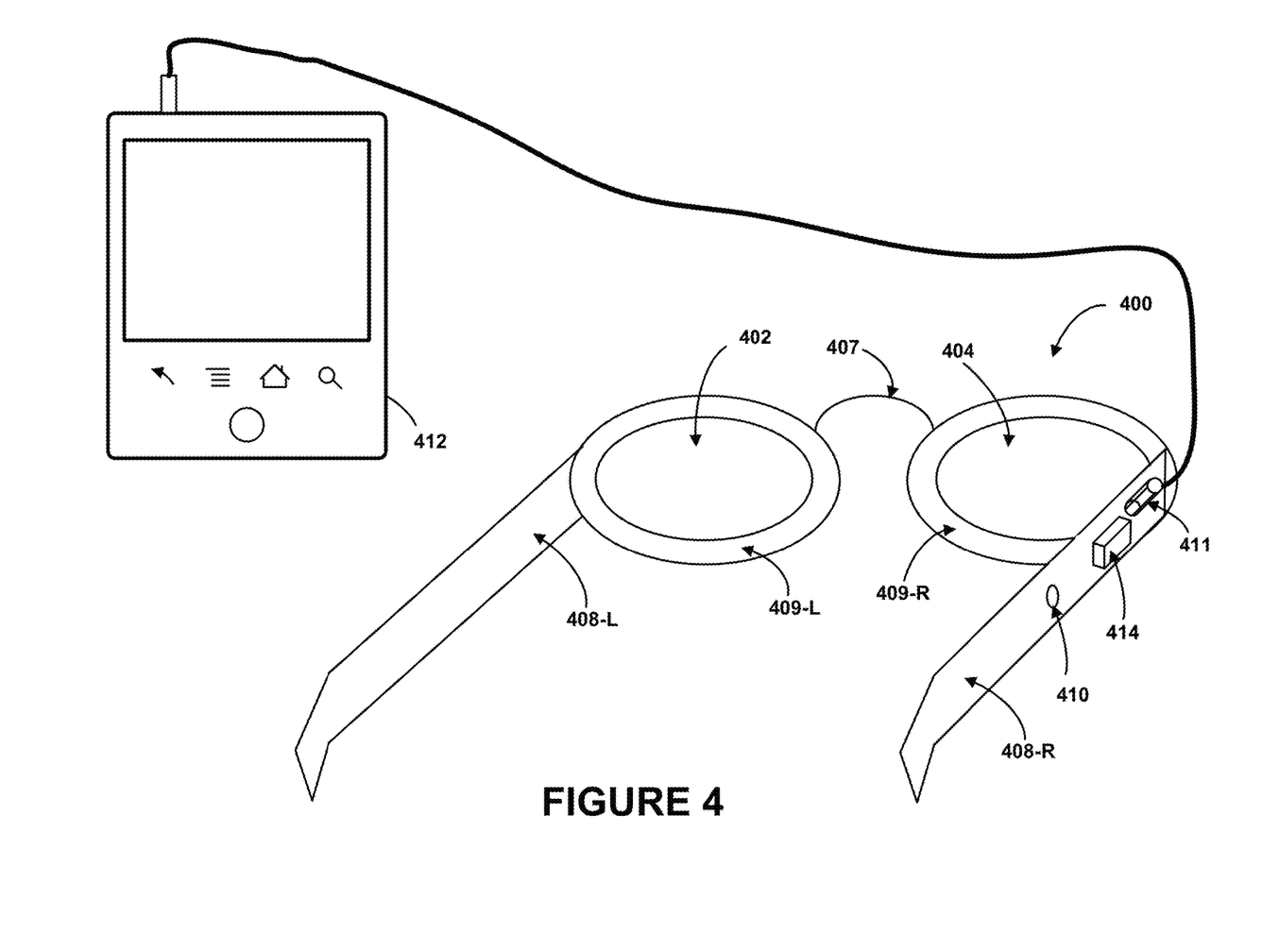
FIG. 4 is a simplified illustration of a head-mounted display configured for indirect bone-conduction audio, according to an exemplary embodiment.

FIG. 4 is a simplified illustration of an HMD configured for indirect bone-conduction audio, according to an exemplary embodiment. As shown, HMD 400 includes two optical elements 402, 404. The frame of HMD 400 includes two side arms 408-L and 408-R, two lens-frames 409-L and 409-R, and a nose bridge 407. The nose bridge 407 and side arms 408-L and 408-R are arranged to fit behind a wearer's ears and hold the optical elements 402 and 404 in front of the wearer's eyes via attachments to the lens-frames 409-L and 409-R.

Further, HMD 400 may include various audio sources, from which audio signals may be acquired. For example, HMD 400 includes a microphone 410. Further, HMD 400 may additionally or alternatively an internal audio playback device. For example, an on-board computing system (not shown) may be configured to play digital audio files. Yet further, HMD 400 may be configured to acquire an audio signal from an auxiliary audio playback device 412, such as a portable digital audio player, smartphone, home stereo, car stereo, and/or personal computer. Other audio sources are also possible.

An exemplary HMD may also include one or more audio interfaces for receiving audio signals from various audio sources, such as those described above. For example, HMD 400 may include an interface for receiving an audio signal from microphone 410. Further, HMD 400 may include an interface 411 for receiving an audio signal from auxiliary audio playback device 412 (e.g., an "aux in" input). The interface to the auxiliary audio playback device 412 may be a tip, ring, sleeve (TRS) connector, or may take another form. HMD 412 may additionally or alternatively include an interface to an internal audio playback device. For example, an on-board computing system (not shown) may be configured to process digital audio files and output audio signals to a speaker or speakers. Other audio interfaces are also possible.

HMD 400 also includes a vibration transducer 414 located on side arm 408-R, which functions as an indirect bone-conduction speaker. Various types of bone-conduction transducers (BCTs) may be implemented, depending upon the implementation. Further, it should be understood that any component that is arranged to vibrate the HMD 400 may be incorporated as a vibration transducer, without departing from the scope of the invention.

Vibration transducer 414 is configured to vibrate at least a portion of the eyeglass frame 406 based on an audio signal received via one of the audio interfaces. In an exemplary embodiment, the side arm 408-R is configured such that when a user wears HMD 400, an inner wall of a first portion of side arm 408-R contacts the wearer so as to vibrationally couple to a bone structure of the wearer. For example, side arm 408-R may contact the wearer at or near where the side-arm is placed between the wearer's ear and the side of the wearer's head, such as at the wearer's mastoid. Other points of contact are also possible.

Eyeglass frame 406 may be arranged such that when a user wears HMD 400, the eyeglass frame contacts the wearer. As such, when the vibration transducer 414 vibrates the eyeglass frame 406, the eyeglass frame can transfer vibration to the bone structure of the wearer. In particular, vibration of the eyeglass frame 406 can be transferred at areas where the eyeglass frame contacts the wearer directly. For instance, the eyeglass frame 406 may transfer vibration, via contact points on the wearer's ear, the wearer's nose, the wearer's temple, the wearer's eyebrow, or any other point where the eyeglass frame 406 directly contacts the wearer.

In an exemplary embodiment, vibration transducer 414 is located on a second portion of the side-arm 408-R, away from the first portion of the side-arm 408-R that vibrationally couples to wearer. Further, in an exemplary embodiment, vibration transducer 414 vibrates the support structure without directly vibrating the wearer. To achieve this result, the second portion of the side-arm 408-R, at which vibration transducer 414 is located, may have an inner wall that does not contact the wearer. This configuration may leave a space between the second portion of the side-arm 408-R and the wearer, such that the vibration transducer indirectly vibrates the wearer by transferring vibration from the second portion to the first portion of the side-arm 408-R, which in turn is vibrationally coupled to the wearer.

In practice, the spacing of the vibration transducer may be accomplished by housing the transducer in or attaching the transducer to the side-arm in various ways. For instance, as shown, the vibration transducer 414 is attached to and protruding from the exterior wall of side arm 408-R. Other arrangements are possible as well. For example, a vibration transducer may be attached to an inner wall of the side arm (while still configured to leave space between the vibration transducer and the wearer). As another example, a vibration transducer may be enclosed within a side arm having the vibration transducer. As yet another example, a vibration transducer may be partially or wholly embedded in an exterior or interior wall of a side arm. Furthermore, vibration transducers may be arranged in other locations on or within side-arm 408-L and/or 408-R. Additionally, vibration transducers may be arranged on or within other parts of the frame, such as the nose bridge sensor 407 and/or lens frames 409-L and 409-R.

In a further aspect of the illustrated arrangement, the location of the vibration transducer may enhance the vibration of the side-arm 408-R. In particular, side-arm 408-R may contact and be held in place by the lens-frame 408-R on one end, and may contact and be held in place by the wearer's ear on the other end (e.g., at the wearer's mastoid), allowing the portion of the side-arm between these points of contact to vibrate more freely. Therefore, placing vibration transducer 414 between these points of contact may help the transducer vibrate the side-arm 408-R more efficiently. This in turn may result in more efficient transfer of vibration from the eyeglass frame to the wearer's bone structure.

Further, when there is space between vibration transducer 414 and the wearer, some vibrations from the vibration transducer may also be transmitted through the air, and thus may be heard by the wearer over the air. In other words, the user may perceive the sound from vibration transducer 414 using both tympanic hearing and bone-conduction hearing. In such an embodiment, the sound that is transmitted through the air and perceived using tympanic hearing may complement the sound perceived via bone-conduction hearing. Furthermore, while the sound transmitted through the air may enhance the sound perceived by the wearer, the sound transmitted through the air may be unintelligible to others nearby. Further, in some arrangements, the sound transmitted through the air by the vibration transducer may be inaudible (possibly depending upon the volume level).

B. Other Arrangements of Vibration Transducers on an HMD

Figure 5:
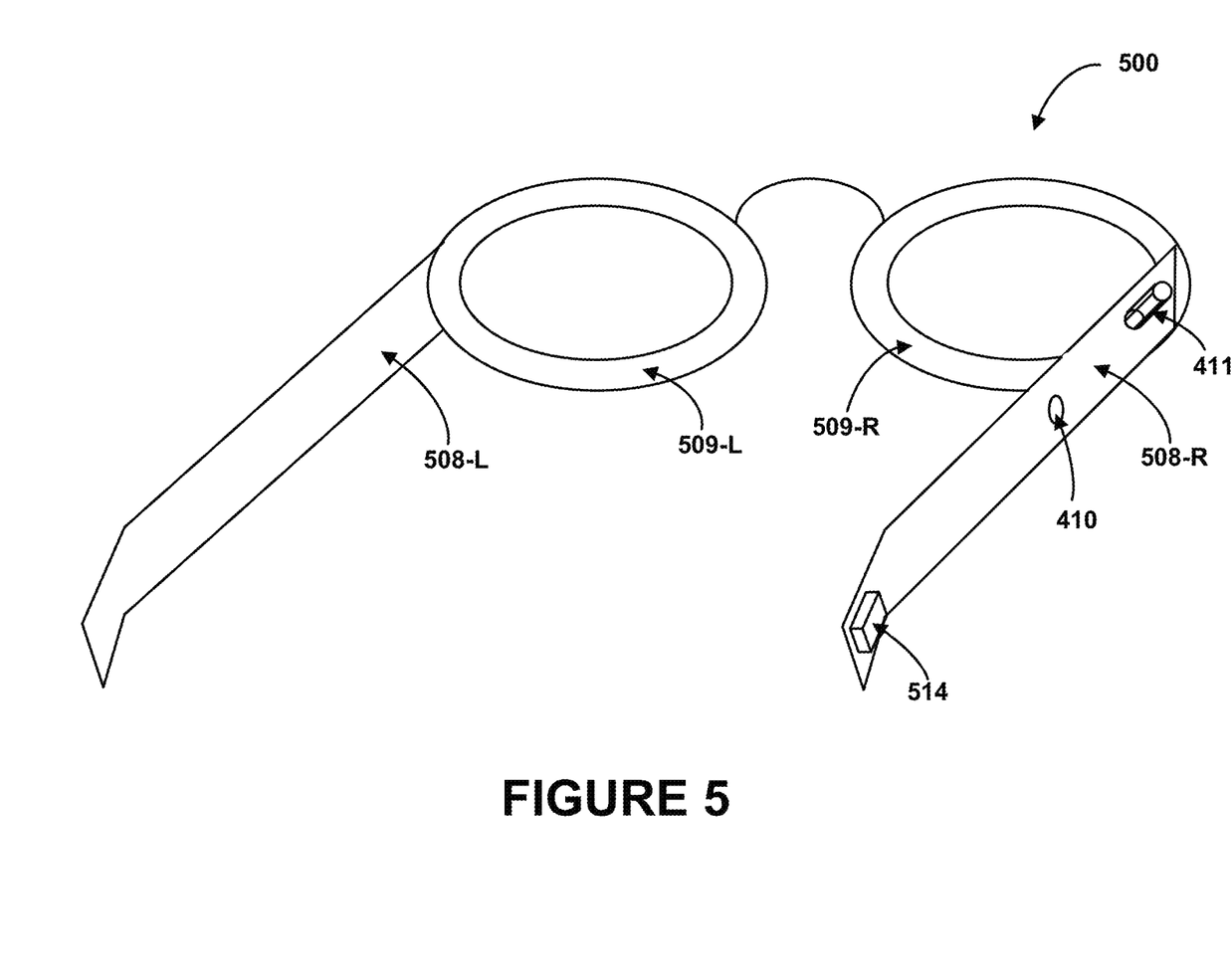
FIG. 5 is another block diagram illustrating an HMD configured for indirect bone-conduction audio, according to an exemplary embodiment.

Other arrangements of a vibration transducer or transducers on a side-arm and elsewhere on the HMD frame are also possible. For example, FIG. 5 is another block diagram illustrating an HMD configured for indirect bone-conduction audio, according to an exemplary embodiment. In particular, FIG. 5 shows an HMD 500, in which a vibration transducer 514 is arranged on an outer wall of side-arm 508-R. As such, when HMD 500 is worn, a portion of side-arm 508-R on which vibration transducer 514 is located is proximate to the pit behind the ear lobe of the wearer.

When located as such, a gap may exist between the wearer and the portion of side-arm 508-R to which vibration transducer 514 is attached. As a result, driving vibration transducer 514 with an audio signal vibrates side-arm 508-R. While the portion of side-arm 508- to which vibration transducer 514 is attached does not contact the wearer, side-arm 508-R may contact the wearer elsewhere. In particular, side-arm 508-R may contact the wearer in between the ear and the head, such as at location 516, for example. Accordingly, vibrations of side-arm 508-L may be transferred to a wearer's bone structure at location 516. Therefore, by vibrating side-arm 508-R, which in turn vibrates the wearer's bone structure, vibration transducer 514 may serve as an indirect bone conduction speaker.

Figure 6:
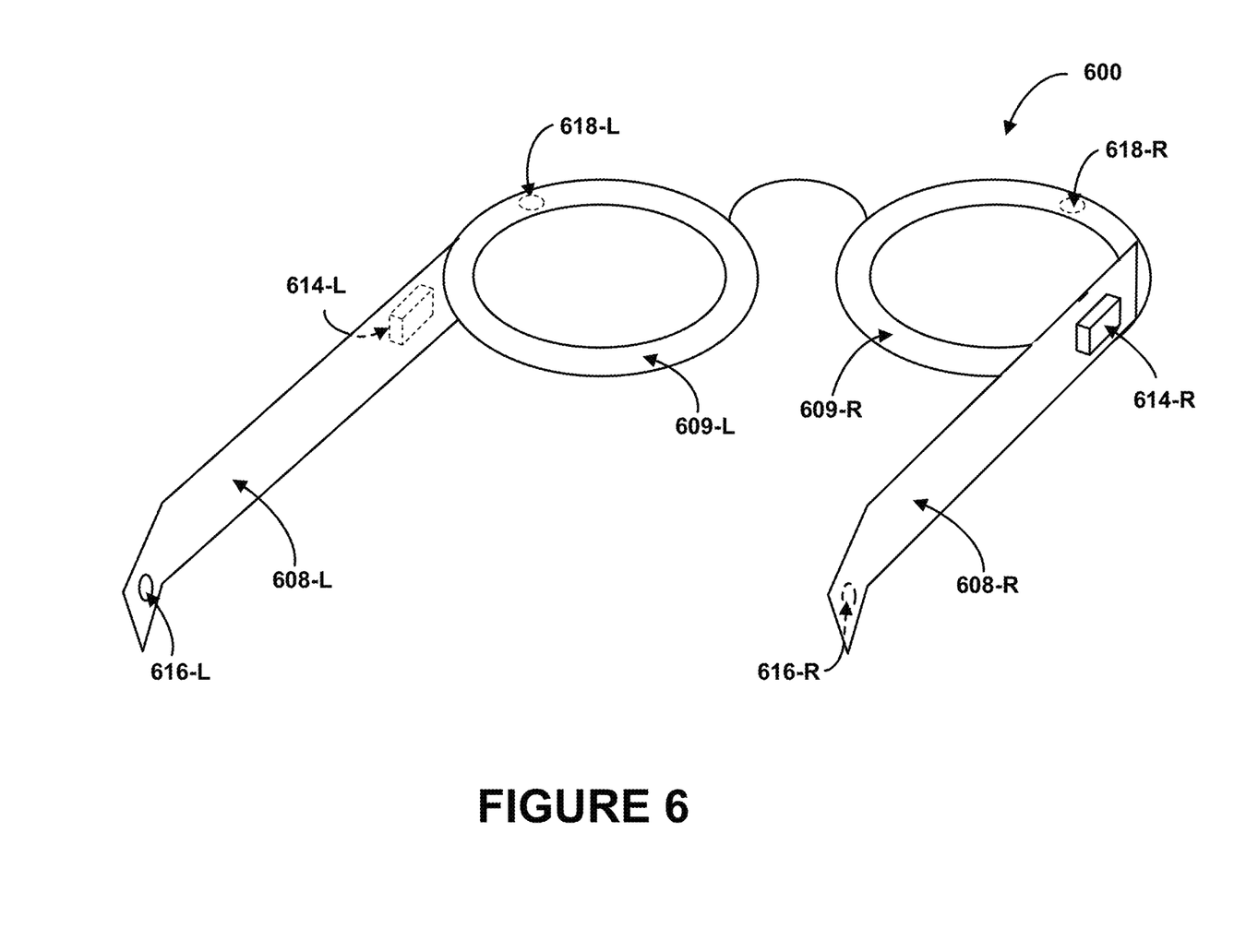
FIG. 6 is another block diagram illustrating an HMD configured for indirect bone-conduction audio, according to an exemplary embodiment.

In a further aspect, some embodiments may include two or more vibration transducers in various locations on the eyeglass frame. For example, FIG. 6 is another block diagram illustrating an HMD configured for indirect bone-conduction audio, according to an exemplary embodiment. In particular, FIG. 6 shows an HMD 600, which includes two vibration transducers 614 and 615. As shown vibration transducers 614 and 615 are arranged on the side arms 608-L and 608-R, respectively. Arranged as such, when HMD 600 is worn, vibration transducers 614 and 615 are typically located on portions of side-arm 608-L and 608-R, respectively, which are proximate to a wearer's left and right temple, respectively. For example, vibration transducer 614 may be located on the outer wall of side-arm 608-L, in between the wearer's left eye and left ear. Similarly, vibration transducer 615 may be located on the outer wall of side-arm 608-R, in between the wearer's right eye and right ear.

C. Fitting Pieces

In a further aspect, an exemplary HMD may include one or more couplers arranged on the HMD. These couplers may help to enhance the fit of the HMD frame to the wearer, such that the HMD fits in a more secure and/or a more comfortable manner. Further, in an exemplary embodiment, these couplers may help to more efficiently transfer vibration of the HMD frame to the bone structure of the wearer.

As an example of such couplers, HMD 600 includes two fitting pieces 616-L and 616-R. As shown, fitting piece 616-L is located on an inner wall of side-arm 608-L and extends from a portion of the inner wall that is proximate to the pit behind the left ear lobe of the wearer. Configured as such, fitting piece 616-L may serve to fill any gap between the wearer's body and the side-arm 608-L. Further, fitting piece 616-R may be configured in a similar manner as fitting piece 616-L, but with respect to the right side of the wearer's body.

In exemplary embodiments, the fitting pieces or any type of couplers may be attached to, embedded in, and/or enclosed in the HMD frame at various locations. For example, fitting pieces may be located in various locations so as to fill space between an HMD frame and wearer's body, and thus help the HMD frame vibrate the wearer's bone structure. For instance, a fitting piece may be configured to contact a wearer's ear, nose, temple, eyebrow, nose (e.g., at the bridge of the nose), or neck (e.g., at the pit behind the ear lobe), among other locations.

Generally, it should be understood that an exemplary embodiment may include only one coupler, or may include two or more couplers. Further, it should be understood that an exemplary embodiment need not include any couplers.

D. Additional Features of an HMD with Vibration Transducer Speaker

In some embodiments, an HMD may be configured with multiple vibration transducers, which may be individually customizable. For instance, as the fit of an HMD may vary from user-to-user, the volume of speakers may be adjusted individually to better suit a particular user. As an example, an HMD frame may contact different users in different locations, such that a behind-ear vibration transducer (e.g., vibration transducer 514 of FIG. 5) may provide more-efficient indirect bone conduction for a first user, while a vibration transducer located near the temple (e.g., vibration transducer 414 of FIG. 4) may provide more-efficient indirect bone conduction for a second user. Accordingly, an HMD may be configured with one or more behind-ear vibration transducers and one or more vibration transducers near the temple, which are individually adjustable. As such, the first user may choose to lower the volume or turn off the vibration transducers near the temple, while the second user may choose to lower the volume or turn off the behind-ear vibration transducers. Other examples are also possible.

In some embodiments, different vibration transducers may be driven by different audio signals. For example, in an embodiment with two vibration transducers, a first vibration transducer may be configured to vibrate a left side-arm of an HMD based on a first audio signal, and a second vibration transducer may be configured to vibrate a second portion of the support structure based on a second audio signal.

In some embodiments, the above configuration may be used to deliver stereo sound. In particular, two individual vibration transducers (or possibly two groups of vibration transducers) may be driven by separate left and right audio signals. As a specific example, referring to FIG. 6, vibration transducer 614-L may vibrate side-arm 608-L based on a "left" audio signal, while vibration transducer 614-R may vibrate side-arm 608-R based on a "right" audio signal. Other examples of vibration transducers configured for stereo sound are also possible.

Furthermore, an HMD may include more than two vibration transducers (or possibly more than two groups of vibration transducers), which each are driven by a different audio signal. For example, multiple vibration transducers may be individually driven by different audio signals in order to provide a surround sound experience.

Further, in some embodiments, different vibrations transducers may be configured for different purposes, and thus driven by different audio signals. For example, one or more vibrations transducers may be configured to deliver music, while another vibration transducer may be configured for voice (e.g., for phone calls, speech-based system messages, etc.). Other examples are also possible.

E. Vibration Dampeners

In a further aspect, an exemplary HMD may include one or more vibration dampeners that are configured to substantially isolate vibration of a particular vibration transducer or transducers. For example, when two vibration transducers are arranged to provide stereo sound, a first vibration transducer may be configured to vibrate a left side-arm based on a "left" audio signal, while a second vibration transducer may be configured to vibrate a right side-arm based on a second audio signal. In such an embodiment, one or more vibration transducers may be configured to (a) substantially reduce vibration of the right arm by the first vibration transducer and (b) substantially reduce vibration of the left arm by the second vibration transducer. By doing so, the left audio signal may be substantially isolated on the left arm, while the right audio signal may be substantially isolated on the right arm.

Vibration dampeners may vary in location on an HMD. For instance, continuing the above example, a first vibration dampener may be coupled to the left side-arm and a second vibration dampener may be coupled to the right side-arm, so as to substantially isolate the vibrational coupling of the first vibration transducer to the left side-arm and vibrational coupling of the second vibration transducer to the second right side-arm. To do so, the vibration dampener or dampeners on a given side-arm may be attached at various locations along the side-arm. For instance, referring to FIG. 4, vibration dampeners may be attached at or near where side-arms 408-L and 408-R are attached to lens-frames 409-L and 409-R, respectively.

As another example, vibration transducers may be located on the left and right lens-frames, as illustrated in FIG. 6 by vibration transducers 618-L and 618-R. In such an embodiment, HMD 600 may include vibration dampeners (not shown) that help to isolate vibration of the left side of HMD 600 from the right side of HMD 600. For instance, to help vibrationally isolate vibration transducers 618-L and 618-R, vibration dampeners may be attached at or near where lens-frames 609-L and 609-R couple to nose bridge 607. Additionally or alternatively, a vibration dampener (not shown) may be located or attached to nose bridge 607, in order to help prevent: (a) vibration transducer 618-L from vibrating the right side of HMD 600 (e.g., lens frame 609-R and/or side-arm 608-R) and (b) vibration transducer 618-R from vibrating the left side of HMD 600 (e.g., lens frame 609-L and/or side-arm 608-R).

In an exemplary embodiment, vibration dampeners may vary in size and/or shape, depending upon the particular implementation. Further, vibration dampeners may be attached to, partially or wholly embedded in, and/or enclosed within the frame of an exemplary HMD. Yet further, vibration dampeners may be made of various different types of materials. For instance, vibration dampeners may be made of silicon, rubber, and/or foam, among other materials. More generally, a vibration dampener may be constructed from any material suitable for absorbing and/or dampening vibration. Furthermore, in some embodiments, a simple air gap between the parts of the HMD may function as a vibration dampener (e.g., an air gap where a side arm connects to a lens frame).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A wearable-computing system comprising: a support structure comprising a front section and at least one side section, wherein the side section is arranged to be located on a side of a face when the support structure is worn; an audio interface configured to receive an audio signal; and at least one vibration transducer located on the at least one side section; wherein the support structure is configured such that when worn, a first portion of the at least one side section has an inner wall that contacts a wearer at or behind an ear so as to vibrationally couple to a bone structure at or behind the ear; wherein the vibration transducer is located on a second portion of the at least one side section, wherein the side section is arranged such that when the support structure is worn, the second portion and the vibration transducer are adjacent to a temple of the wearer and do not contact the wearer; wherein the at least one vibration transducer is configured transfer vibration, based on the audio signal, to the second portion of the at least one side section adjacent to the temple, wherein the vibration transferred to the second portion propagates through the at least one side section to the first portion of the side section at or behind an ear where said vibration is transferred to the bone structure of the wearer.

2. The method of claim 1, wherein the second portion of the at least one side section is proximate to a connection between the at least one side section and the front section.

3. The system of claim 1, wherein the system comprises a head-mounted display (HMID) that includes the support structure, one or more optical elements, and a touchpad interface located on at least one of the side sections of the support structure.

4. The system of claim 3, wherein the one or more optical elements comprise one or more graphic displays.

5. The system of claim 1, wherein the support structure is configured, when worn, to provide, a separation distance between the vibration transducer and the wearer such that the vibration transducer does not directly transfer vibration to the wearer's bone structure.

6. The system of claim 1, further comprising at least one coupler located on the inner wall of the first portion of the at least one side section such that the at least one coupler contacts the wearer, wherein the at least one coupler are configured to enhance the vibrational coupling of the support structure to the bone structure of the wearer.

7. The system of claim 6, wherein the at least one coupler is configured to contact a wearer at a given location, wherein the given location comprises at least one of: (a) a location on the back of the wearer's ear, (b) a location on or above the wearer's nose, (c) a location near the wearer's temple, (d) a location on the wearer's eyebrow, and (a) a location on the wearer's neck.

8. The system of claim 6, wherein the at least one coupler is configured to contact a wearer at a mastoid of the wearer.

9. The system of claim 1, wherein the vibration transducer is attached to an outer wall of the at least one side section.

10. The system of claim 1, wherein the vibration transducer is partially embedded in an outer wall of the at least one side section.

11. The system of claim 1, wherein the vibration transducer is enclosed within the at least one side section.

12. The system of claim 1, wherein the vibration transducer is partially embedded in an inner wall of the at least one side section.

13. The system of claim 1, wherein the vibration transducer is attached to an inner wall of the at least one side section.

14. The system of claim 1, wherein the at least one side section comprises a first side section and a second side section, and wherein the vibration transducer is included on only the first side section.

15. The system of claim 1, wherein the at least one side section comprises a first side section and a second side section, and wherein the at least one vibration transducer comprises a first vibration transducer located on the first side section and a second vibration transducer located on the second side section.

16. The system of claim 15, wherein the first vibration transducer is configured to vibrate a first portion of the support structure based on a first audio signal, and wherein the second vibration transducer is configured to vibrate a second portion of the support structure based on a second audio signal.

17. The system of claim 16:
wherein the first vibration transducer is configured to vibrate at least a portion of the first side section based on a first audio signal, and wherein the second vibration transducer is configured to vibrate at least a portion of the second side section based on a second audio signal;
wherein the at least one vibration dampener comprises a first vibration dampener vibrationally coupled to the first side section and a second vibration dampener vibrationally coupled to the second side section, wherein the first vibration dampener is configured to substantially isolate the vibrational coupling of the first vibration transducer to the first side section from other portions of the support structure, and wherein the second vibration dampener is configured to substantially isolate the vibrational coupling of the second vibration transducer to the second side section from other portions of the support structure.

18. A wearable-computing system comprising: a support structure comprising a front section and at least one side section, wherein the side section is arranged to be located on a side of a face when the support structure is worn; a means for receiving an audio signal; and a means for vibrating at least a portion of the support structure based on the audio signal, wherein the means for vibrating is located on the at least one side section; wherein the support structure is configured such that when worn, a first portion of the at least one side section has an inner wall that contacts a wearer at or behind an ear so as to vibrationally couple to a bone structure of the wearer at or behind the ear; wherein the means for vibrating is located on a second portion of the at least one side section, wherein the side section is arranged such that when the support structure is worn, the second portion and the vibration transducer are adjacent to a temple of the wearer and do not contact the wearer, wherein the means for vibrating is configured transfer vibration, based on the audio signal, to the second portion of at least one side section adjacent to the temple, wherein the vibration transferred to the second portion propagates through the at least one side section to the first portion of the side section at or behind an ear where said vibration is transferred to the bone structure of the wearer.

19. The system of claim 18, further comprising means for coupling the support structure to the wearer, wherein the means for coupling is located on the inner wall of the first portion of the at least one side section such that the means for coupling contacts the wearer, and wherein the means for coupling is configured to enhance the vibrational coupling of the support structure to the bone structure of the wearer.

20. The system of claim 19, wherein the means for coupling is configured to contact the wearer at a mastoid of the wearer.

* * * * *